Aug. 7, 1956 — C. W. CHESTER — 2,757,955
GLARE SHIELD FOR AUTOMOBILES
Filed Jan. 18, 1954
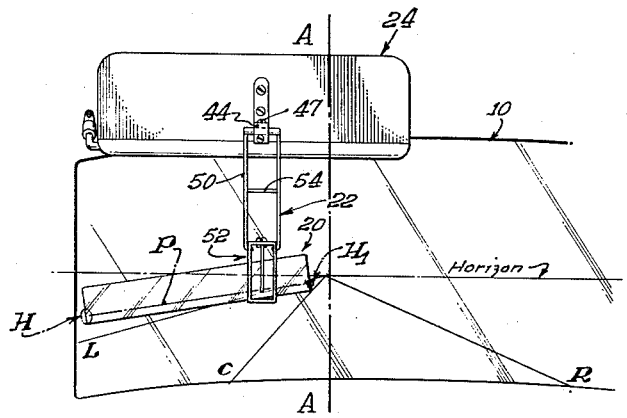
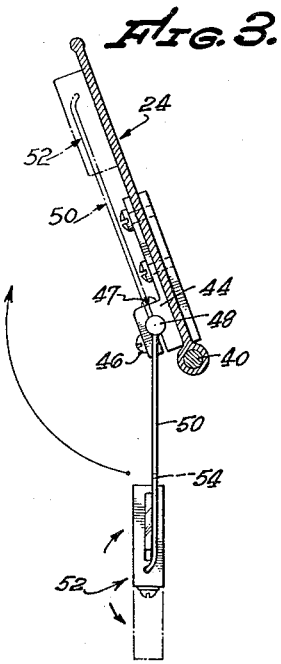
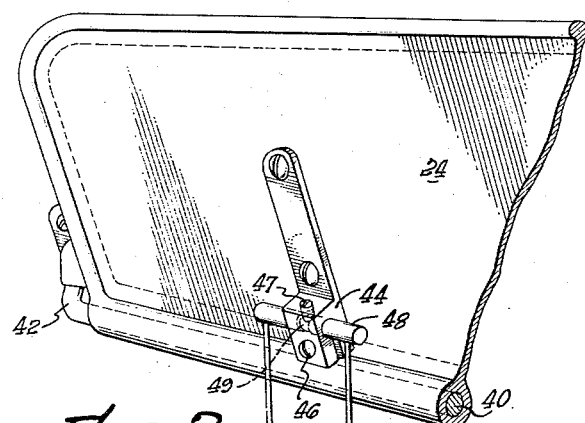
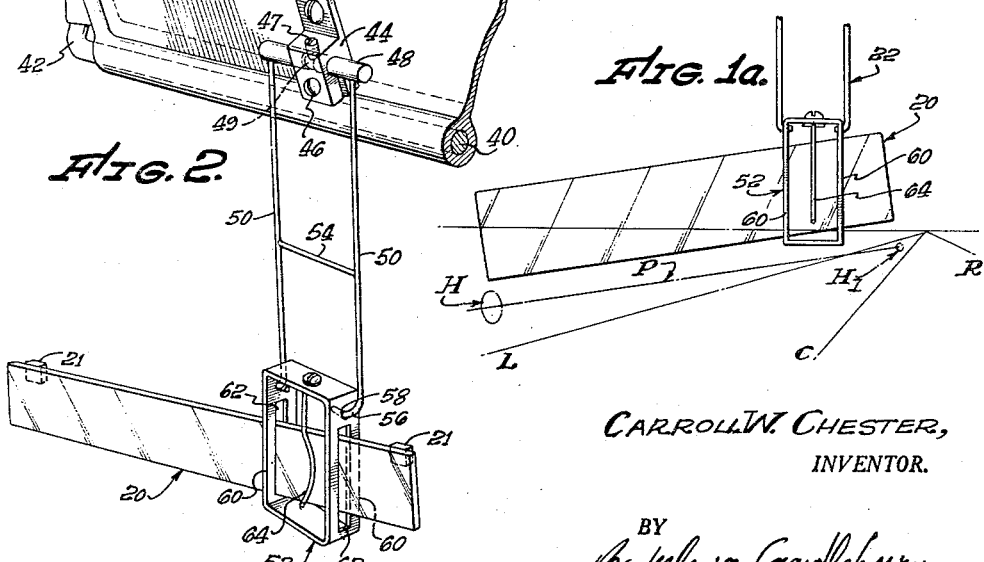
CARROLL W. CHESTER,
INVENTOR.
BY
Bakelewo & Caudlebury
ATTORNEYS

2,757,955
GLARE SHIELD FOR AUTOMOBILES

Carroll W. Chester, Los Angeles, Calif.

Application January 18, 1954, Serial No. 404,624

7 Claims. (Cl. 296—97)

This invention relates to glare shields; particularly to shields for protecting an automobile driver from the glare of approaching headlights. The desirability of and demand for a shield which will effectively perform that function has long been recognized, so the reasons for the need of a fully effective shield need not be discussed here. Many attempts have been made to provide an effective shield for the purpose, but for various reasons, such as undue obscuration of too much of the driver's field of clear view, lack of adjustability to suit different cars and drivers, and lack of suitable and easily operated arrangements for removal from the field of sight when not being used; due to such, and various other reasons, no completely effective and satisfactory shield for the purpose has been produced.

It is the general object of the present invention to provide a glare shield which overcomes all the difficulties attendant former devices; and there are further objects and corresponding accomplishments of the invention which will appear from consideration of the following description of a preferred and illustrative embodiment, reference for the purpose being had to the accompanying drawings in which:

Figs. 1 and 1a are diagrammatic views illustrating certain principles and features of the invention;

Fig. 2 is a perspective illustrating a preferred and illustrative embodiment; and Fig. 3 is a side elevation illustrating the embodiment of Fig. 2 in a partially folded position.

Referring first to Figs. 1 and 1a, the outline of a typical automobile windshield is shown at 10, and the horizontal line labelled "horizon" indicates a driver's typical horizon as he sees it on a level road ahead seated in the driver's seat. The vertical line A—A indicates the vertical plane centered on the driver's eyes (or, more particularly, his right eye) and longitudinal of a straight road ahead. The driver's typical view through the windshield of the road ahead is indicated by the three lines L, C and R, which respectively represent the left-hand edge, the center line, and the right-hand edge of the road; these lines converging to a point on the driver's horizon and in the longitudinal plane A—A.

The typical position in which the driver sees, with his left eye, the headlights of a car passing in the next lane to the left just as they disappear at the left-hand edge of the windshield, is shown at H. The typical apparent path of those headlights as the driver sees them from the time they appear at or slightly above and to the left of the road center line at the point H1 until they pass out of his sight on his left, are indicated by the broken line labelled P. The apparent paths of a pair of approaching headlights are approximately the same, nearly enough to be, for the purposes of this invention, treated as the same. The single line P indicates, to sufficient accuracy, the paths of both headlights as seen by either or both eyes, from the right eye position H1 to the left eye position H. The apparent path of headlights approaching and passing in a lane further to the left is very close in apparent position to line P, only slightly higher.

Note that the line P indicates, in the view of the driver, the apparent line location of the headlight paths as they appear on a transverse vertical plane in front of the driver; for instance, on a vertical plane, represented in Fig. 1 by the plane of the drawing, located behind the windshield and far enough forward of the driver to be forward of the steering wheel and out of the way of his hands as he manipulates the wheel. In the typical automobile of today, a vertical transverse plane substantially in the plane of the upper edge of the windshield, or substantially in the plane of the movable sun visors that are commonly located at the upper edge of the windshield, is a suitable plane for the location of the glare shield, provided by this invention. Without limitation of the invention to that particular plane, the following description will assume such a plane for purposes of explanation.

Thus, in that plane, path line P represents the apparent headlight paths in that plane as explained above. The paths of headlights further to the left are apparently slightly higher but at substantially the same perspective angle. The apparent paths of all headlights, as they appear to a taller person, are higher than P, at the same perspective angle. The invention protects the driver's eyes under all such circumstances.

The invention provides, in such a plane as indicated, a relatively narrow and elongate shield piece of semi-transparent material, located at such height and extending at such an angle to the horizontal as to include, in that plane, both the lower path P and the other higher paths as they appear to the driver if, as will be explained later, he straightens up slightly or throws his head back slightly to raise his eyes above his normal driving eye level. Such a shield piece is indicated at 20 in Fig. 1. As shown there, it is rectangular in shape but, as will appear, need not be so. Fig. 1a shows the relation of the driver's field of view to the shield piece when he is relaxing in his normal driving posture; Fig. 1 shows that relation when he straightens up or throws his head back to raise his eye level. An adjustable and foldable support device, generally indicated by the numeral 22, supports the shield piece 20, preferably from the usual movable sun visor 24, in a position relative to the apparent headlight paths preferably such as shown in Fig. 1. This mounting is preferably located a little to the left of the driver's view straight ahead, as shown in Fig. 1. In that position of the shield, apparently to the driver's eyes, the headlights of an approaching car first appear, when far down the road, to the right of the right-hand end of shield piece 20. As the headlights approach to a point about five hundred feet away, they reach the apparent position H1 at (or, Fig. 1a, under) the right-hand end of shield 20. Then, if the driver raises his eye level, the approaching headlights travel along the apparent path P (Fig. 1) in the shield close to and parallel to its lower edge to a final position H, just as it disappears at the left edge of the windshield, in the lower left portion or corner of the shield. The other higher apparent paths are similarly related to the shield, somewhat higher on it.

Considering the apparent paths in the shield, it is apparent at once that the shield need not be as wide (in vertical dimension) at its right-hand end as at its left-hand end. It can be, in theory at least, wedge-shaped with its narrow end at the right to take in such a point as H1. However, for convenience in mounting it in such a simple support as now to be described and to facilitate longitudinal adjustment (adjustment to the right or left in its plane) in such a support, it may preferably be rectangular and is so shown here.

Figs. 2 and 3 show my present preferred support for the shield 20, supporting it from a standard sun visor 24 and arranged so that the shield and support may be folded against one face of the visor when the shield is not in use, and allowing the visor then to be used in its normal manner. In these figures the visor 24, mounted typically to swing in adjustment about the horizontal axis 40 and the vertical axis 42, is shown in the upper position which it occupies when not in use, above the left-hand (driver's side) portion of the windshield. I preferably mount my shield support on the visor's face which is rearward in that position.

My present preferred and illustrative form of shield mount embodies a split clamp 44 secured on the rear face of the visor and adjustable by screw 46 to adjust its frictional hold on a short pivot trunnion 48. A screw 47 engages in a groove 49 to prevent longitudinal displacement of the trunnion. From that trunnion a suspending frame depends, formed essentially of two small but stiff wires 50 whose lower ends carry the stirrup 52 that directly carries shield 20. The frame of wires 50 may be cross-braced by a member such as 54, and the lower ends of wires 50 are bent inwardly horizontally as at 56 to form simple hanging pivots for stirrup 52. Stirrup 52 is a rectangular open frame and is hung on wire ends 56 by receiving those ends in holes 58 in the upper parts of its sides 60. Those two sides are slotted as shown at 62 with vertically elongated slots. The shield piece 20 passes through those slots as shown, its thickness being preferably somewhat less than the slot widths so that the shield will not bind in the slots. The height dimension of the slots is sufficiently greater than the shield width that the angular hang of the shield length, with relation to the horizontal, may be adjusted to suit various situations as to car and/or driver. For instance, everything else in the circumstances being the same, the angle with the horizontal to which the shield length should be adjusted, will be smaller for a driver whose eye level is lower. And the same is true where the shield is used in a relatively low hung car where the average eye level is relatively low. Such need of adjustability of the angle of shield hang is apparent from consideration of the perspective of Fig. 1; all of the lines L, C, R, and P, flatten out as the point of view is lowered.

Consequently, to provide simply for such angular adjustability, as well as for easy longitudinal adjustability, the shield 20 fits slots 62 loosely and with ample adjustment play vertically. A small spring 64 mounted on stirrup 52 then presses against one face of the shield to press it against the opposite sides of the slots with sufficient force to hold the shield frictionally in any lateral and angular position in which it is set. To prevent accidental removal of the shield from the stirrup when adjusting its lateral position, the shield face opposite spring 64 has two stop lugs, such as shown at 21. Slots 62 are wide enough to pass the lugs when the pressure of spring 64 is relieved.

All of the mounting parts which lie in the driver's view are relatively thin in that aspect so as to obstruct his view to the minimum degree.

The shield 20 may be of any suitable material which passes light restrictedly in such manner as to enable the driver to see approaching headlights distinctly, but absorbs sufficient light to eliminate glare. Many such materials are known and need not be described here. A preferred material is of the shatter-proof type; two transparent layers with a colored or darkened cementing film of plastic between them. Any such light absorbing material is here referred to by the all-inclusive term semi-transparent.

The actual size, the length and width, of the shield depends on several factors, the primary factor being the distance from the driver's eyes to the plane of the shield. And the elevation of the driver's eyes above the road is a factor in determining the vertical width of the shield necessary to cover the paths of the approaching lights. The smaller that elevation, the narrower the shield. In any and all varying circumstances the dimensions of the shield should be substantially just large enough to take in the apparent paths of the approaching lights. It is important, and is one of the primary features of my invention, that the driver's whole field of view, excepting only substantially that traversed by the near approaching lights, is left completely clear. From Fig. 1 it will be seen that his field of view both above and below the limited field covered by the shield is totally clear, as is also his whole field of view down the center of the road and to his right, and of the whole road beyond the five hundred foot point.

For the average run of present day automobiles, with the shield mounted in or about the vertical plane spoken of, I find that a shield length of about seven inches and width of about one inch are suitable. The height of the shield to suit persons of different eye height can be adjusted by varying the length of the wire frame 50 or the point of mounting attachment to the supporting visor or other part of the car or its equipment. For most cars and drivers, a length of frame 50 of about 4½ inches is found to be about right. And, to an extent to allow height adjustment for different drivers, the height may be adjusted by swinging the shield and its suspension forward or back about the horizontal axis at 48. It is to be noted that all adjustments of position and angularity of the shield are easily made with the use of only the left hand.

In practical use the shield 20 may be set or adjusted to such a height that the driver, in his normal or habitual driving posture, views the whole road ahead under the lower edge of the shield. See Fig. 1a. On the approach of blinding lights he then only has to lift his eyes by straightening up or throwing his head back, to interpose the shield between his eyes and the lights. Such action quickly becomes unconsciously automatic on the driver's part.

The mounting clamp 44 may, of course, be mounted on parts of a car other than its sun visor; for instance, directly on the upper framing of the windshield. However, the visor affords a convenient support, and my mounting is designed to fold on the visor in such manner as not to interfere with its normal use. When the glare shield is not in use, as in daytime driving, the stirrup 52 is folded rearwardly and upwardly about pivots 56 into the position shown in Fig. 3 where the shield 20 bears against the wire frame 50. Then the whole assembly is folded upwardly in the direction indicated by the arrow in Fig. 3 until it lies flatly against the face of visor 24; the friction at clamp 44 holding the assembly in that position out of the way and out of the driver's field of view. The width of most sun visors is sufficient to accommodate the length of frame 50 lying across it. With the shield and its support thus folded flatly against the visor, it may then be used in its normal manner.

I claim:

1. A glare shield structure for protection of vehicle drivers against glare of approaching headlights, comprising in combination a narrow elongate shield piece composed of semi-transparent material, and means for supporting said shield piece on the vehicle in a transverse plane in front of the driver, said supporting means comprising an open-frame stirrup supported so as to be positioned in said plane, said stirrup having thin vertical side members spaced apart in said plane, said vertical side members having vertically extending slots in said plane adapted to receive and support the shield piece for longitudinal sliding adjustment in said plane, said slots being of vertical extent greater than the width of the shield piece so as to allow angular adjustment of that piece in said plane, and spring means bearing against one face of the shield piece and pressing its opposite face against the sides of the slots to hold the shield piece frictionally in adjusted position.

2. A glare shield for protection of vehicle drivers against glare of approaching headlights, comprising a narrow elongate shield piece composed of semi-transparent glare absorbing material, and means for supporting said shield piece on the vehicle in a transverse plane in front of the driver with its length at an angle to the horizontal corresponding generally to the apparent paths of approaching headlights, said supporting means including means allowing angular adjustment of the shield piece in said plane, said supporting means comprising a pivot adapted to be secured to an upper part of the vehicle with its axis horizontal in a transverse plane in front of the driver, a depending support frame embodying essentially only two narrow and spaced supporting wires hung on and adapted to be swung about said pivot, and an open frame stirrup composed of thin horizontal top and bottom members and thin vertical side members slotted to receive and support the shield piece, said stirrup being pivotally hung on the lower end of the supporting frame and foldable about its pivot to a position in the plane of and within the length of the supporting frame.

3. The glare shield defined in claim 2 and in which the vertical extent of the stirrup slots is greater than the width dimension of the shield piece to allow of angular adjustment of the shield piece in its plane, and including also a spring bearing on the shield piece to hold it frictionally in adjusted position.

4. A shield supporting structure adapted to adjustably support a glare shield in a vehicle, comprising a pivot adapted to be secured to an upper part of the vehicle with its axis horizontal in a transverse plane in front of the driver, a depending support frame embodying essentially only two narrow and spaced supporting wires hung on and adapted to be swung about said pivot, and an open frame stirrup composed of thin horizontal top and bottom members and thin vertical side members slotted to receive and support the shield, said stirrup being pivotally hung on the lower end of the supporting frame and foldable about its pivot to a position in the plane of and within the length of the supporting frame.

5. A shield supporting structure as defined in claim 4 and in which the vertical extent of the stirrup slots is greater than the width dimension of the shield piece to allow of angular adjustment of the shield in its plane, and including also a spring bearing on the shield piece to hold it frictionally in adjusted position.

6. In combination with a vehicle sun visor which is pivoted along a horizontal edge to be moved between positions extending respectively upwardly and downwardly from the pivoted edge, a glare shield structure supported on the sun visor and comprising a horizontal pivot mounted on the sun visor near its horizontal pivoted edge, a depending support frame embodying essentially only two horizontally spaced thin frame members, a horizontal pivot carried by the lower end of the support frame, a narrow elongate shield piece of semi-transparent material, and a carrier for the shield piece depending from the last named pivot, said carrier supporting the shield piece for adjustment longitudinally of itself and angularly in its own plane, said carrier being foldable about the second mentioned pivot to a position substantially in the plane and within the length of the support frame, and the support frame and the folded carrier being foldable about the first mentioned pivot to a position against a face of the sun visor and within its width, the carrier being in the form of an open-frame stirrup having thin, horizontally spaced, vertical side members, said members having vertically extending slots to receive and support the shield piece, the vertical extents of the slots being greater than the width of the shield piece, and spring means pressing on one face of the shield piece to hold it frictionally in adjusted position.

7. A glare shield structure for protection of vehicle drivers against glare of approaching headlights, comprising in combination a narrow elongate shield piece composed of semi-transparent material, and means for supporting said shield piece on the vehicle in a transverse plane in front of the driver, said supporting means comprising an open-frame stirrup supported so as to be positioned in said plane, said stirrup having thin vertical side members spaced apart in said plane, said vertical side members having vertically extending slots in said plane adapted to receive and support the shield piece for longitudinal sliding adjustment in said plane, and spring means bearing against one face of the shield piece and pressing its opposite face against the sides of the slots to hold the shield piece frictionally in adjusted position.

References Cited in the file of this patent

UNITED STATES PATENTS

| | | |
|---|---|---|
| 902,784 | Waldref | Nov. 3, 1908 |
| 1,409,340 | Hanna | Mar. 14, 1922 |
| 2,064,746 | Hawk | Dec. 15, 1936 |
| 2,112,726 | Kemp et al. | Mar. 29, 1938 |
| 2,526,889 | McComb | Oct. 24, 1950 |

FOREIGN PATENTS

| | | |
|---|---|---|
| 331,302 | Great Britain | July 3, 1930 |
| 402,700 | Great Britain | Dec. 7, 1933 |
| 820,385 | Germany | Nov. 8, 1951 |
| 130,786 | Sweden | Feb. 6, 1951 |